United States Patent [19]
Brown

[11] 3,820,859
[45] June 28, 1974

[54] ELECTRO MAGNETIC, SUPER-COOLED BEARING

[76] Inventor: Roger A. Brown, 7919 W. Hampton Ave., Milwaukee, Wis. 53218

[22] Filed: Mar. 27, 1972

[21] Appl. No.: 263,723

[52] U.S. Cl. ............................................... 308/10
[51] Int. Cl. ........................................ F16c 39/06
[58] Field of Search .......................... 308/10; 74/5

[56] References Cited
UNITED STATES PATENTS

| | | | |
|---|---|---|---|
| 3,026,151 | 3/1962 | Buchhold | 308/10 |
| 3,221,563 | 12/1965 | Wing | 308/10 |
| 3,243,238 | 3/1966 | Lyman | 308/10 |
| 3,473,852 | 10/1969 | Lyman | 308/10 |
| 3,650,581 | 3/1972 | Boden | 308/10 |

Primary Examiner—R. Skudy
Attorney, Agent, or Firm—James E. Nilles

[57] ABSTRACT

A bearing structure for a rotating shaft including first magnet means extending from the shaft and second magnet means fixed to the supporting housing for the shaft and displaced in the circular path of the first magnet means, cooling means displaced adjacent the circular path of the first magnet means, whereby the shaft is magnetically suspended in radial and axial directions.

7 Claims, 5 Drawing Figures

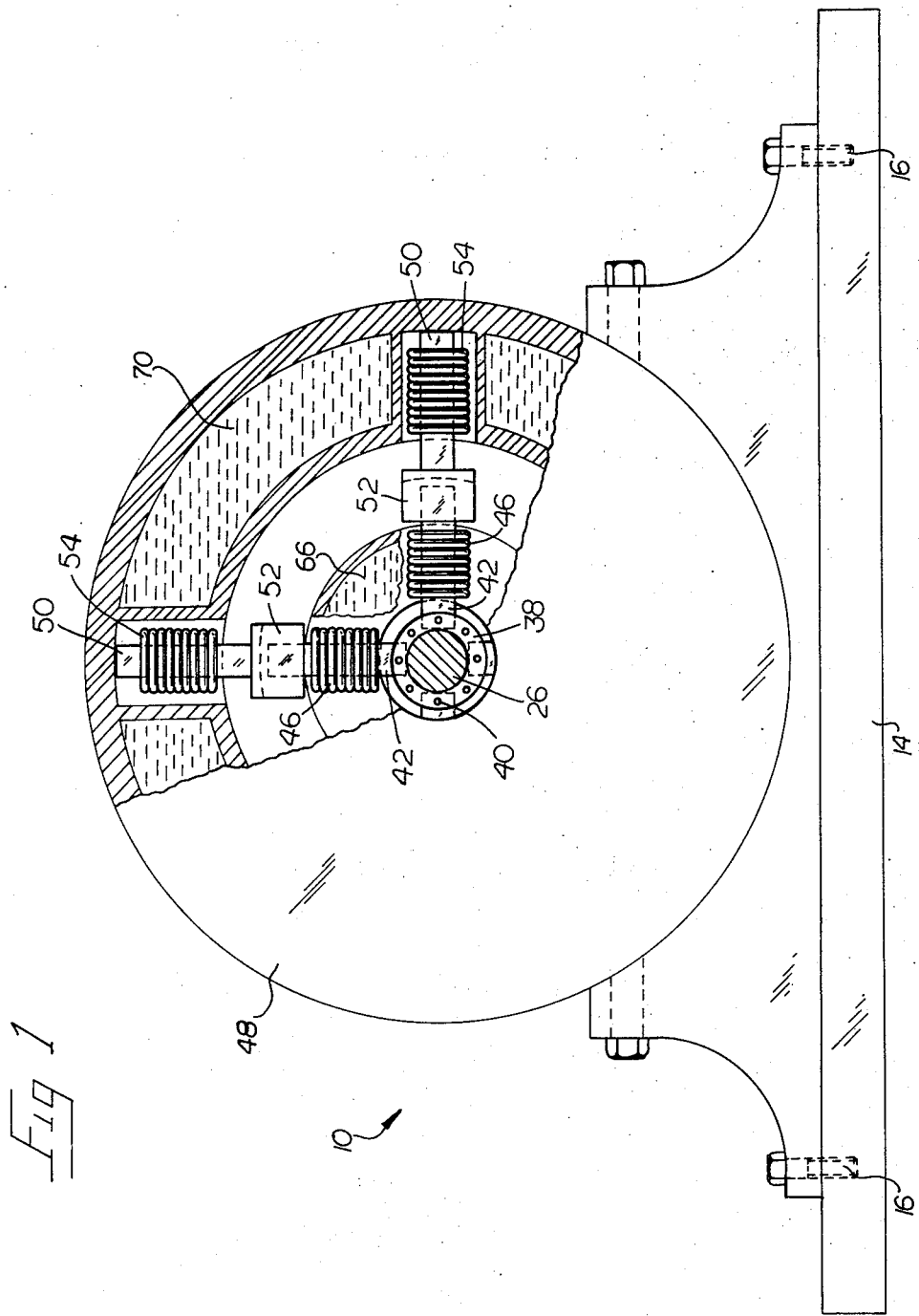

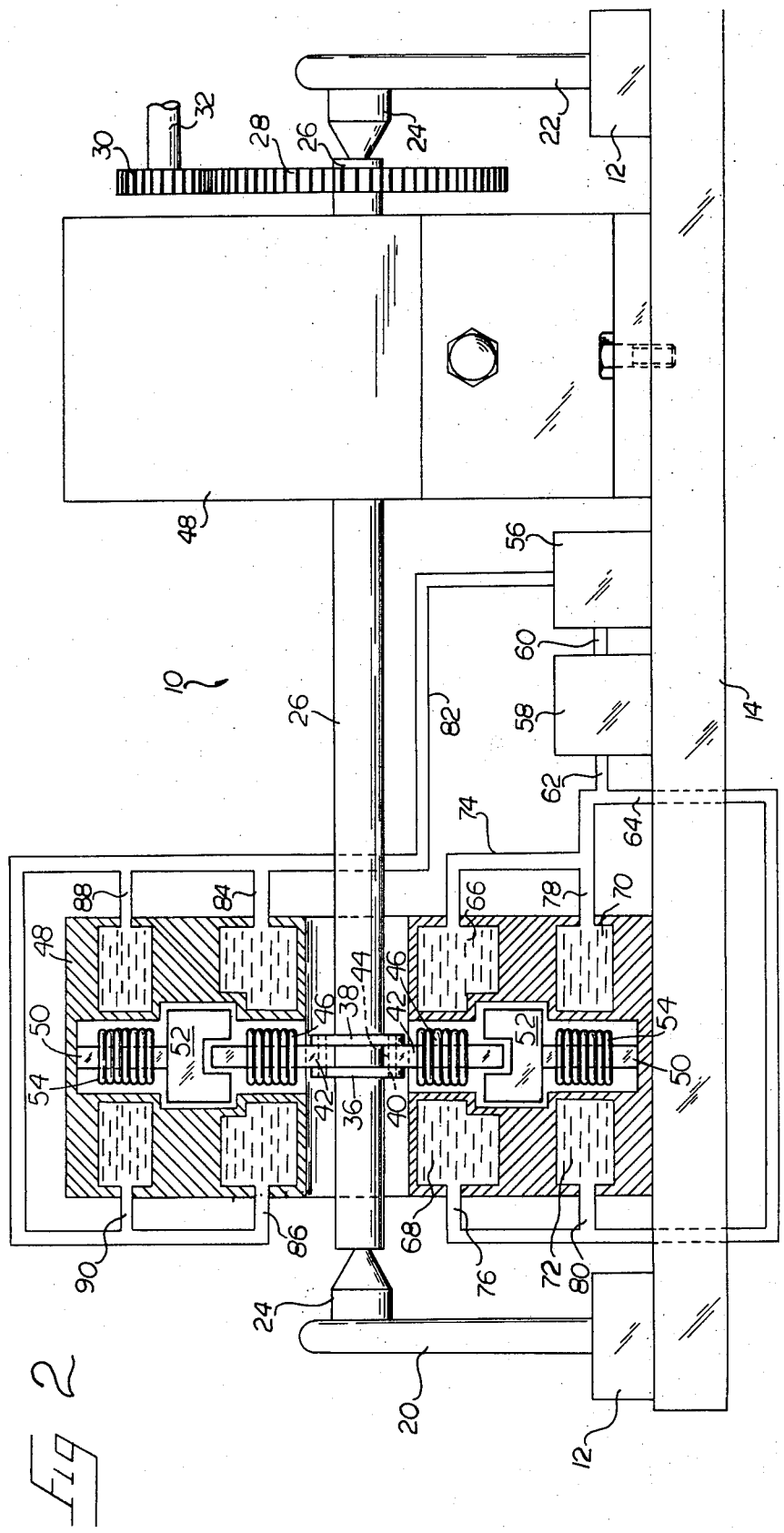

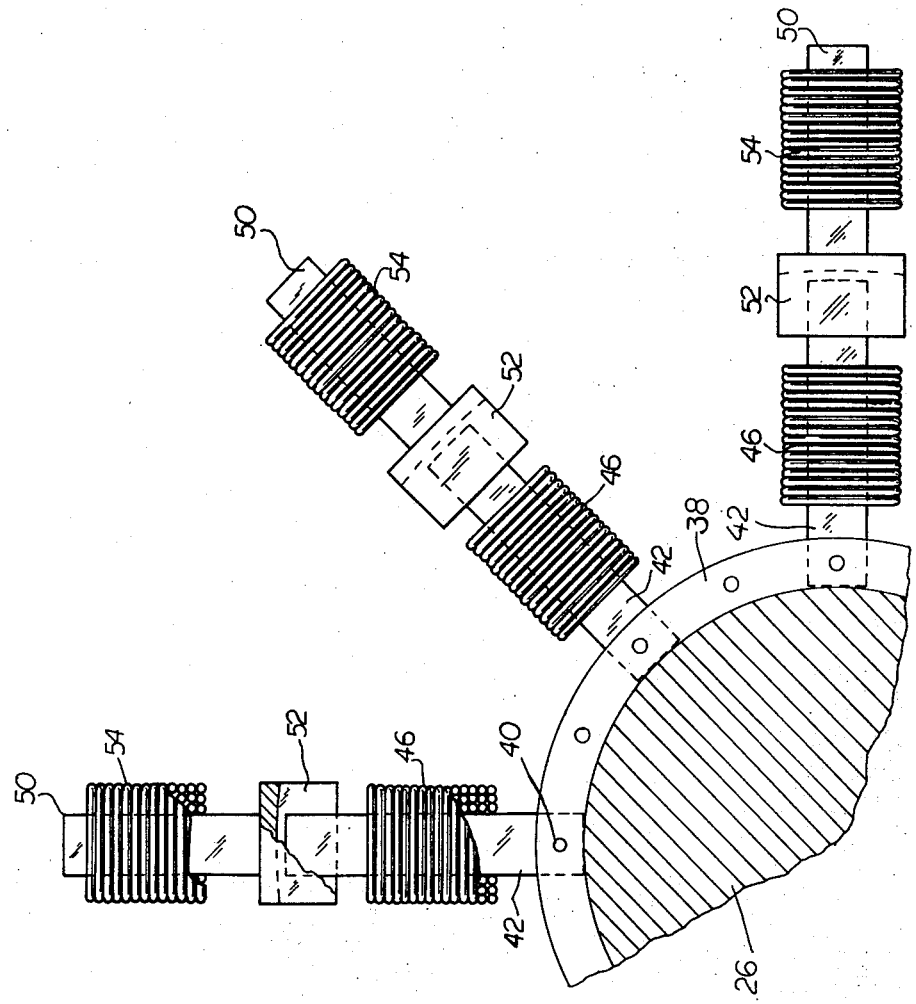

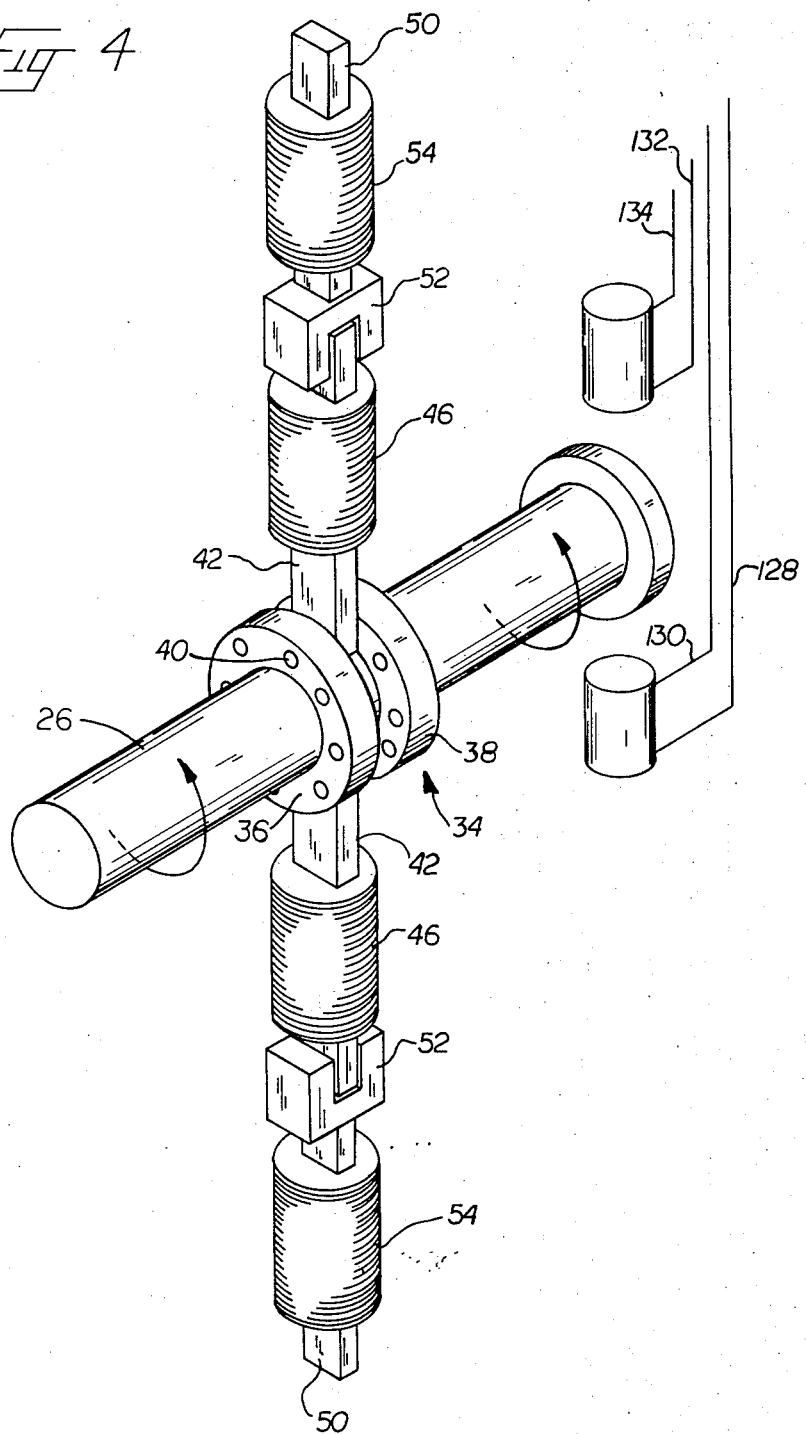

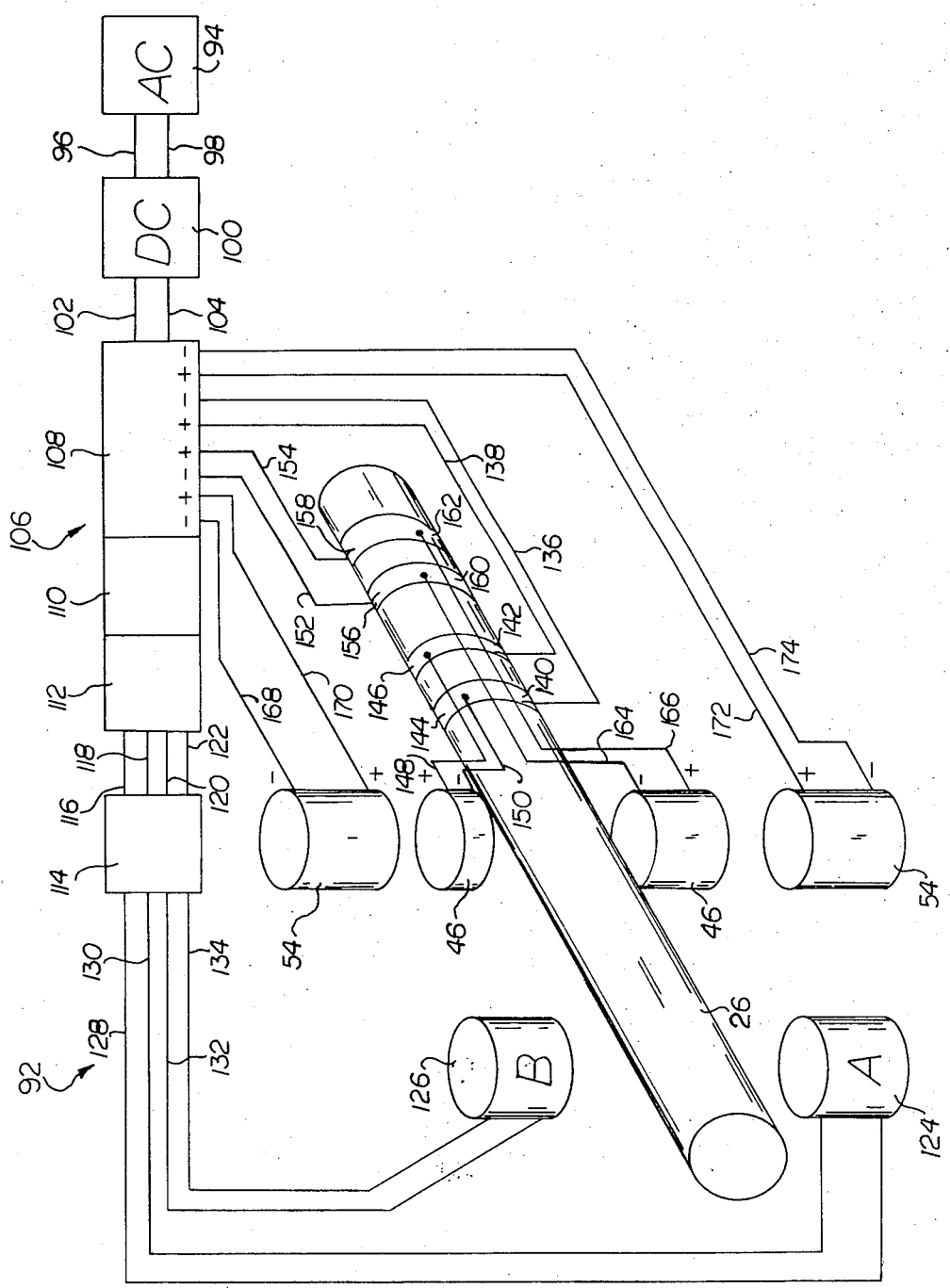

ELECTRO MAGNETIC, SUPER-COOLED BEARING

BACKGROUND OF THE INVENTION

In the past, bearings have been supplied with a variety of structures to keep the supported shaft in a floating position when in operation either using two or more atracting or repelling magnetic forces but with no definite mathematical relationship between the magnets and the attracting or repelling surfaces. No means of super-cooling under specifically controlled conditions have been furnished.

SUMMARY OF THE INVENTION

It is, therefore, the principle object of the present invention to provide magnetic bearings having surfaces of repelling or attracting magnetic forces which will simultaneously compensate for radial and axial movement of the borne object.

It is another object of the present invention to provide an electronically balanced control system in a structure of the character described including sensing means to adjust magnetic forces in response to deviations of the borne object relative to the bearing surfaces.

It is a further object of the present invention to provide in structure of the character described a super-cooling system to decrease the physical size of the total bearing structure in relation to magnetic force required to achieve a frictionless state.

It is still another object of the present invention to provide structure of the character described for bearing of elongated objects permitting the placement of bearing along the longitudinal structure at any point intermediate the extremities of the object.

It is still another object of the present invention to provide structure of the character described wherein a super-cooling system is provided for one or more of the poles substantially increasing the electro-magnetic effectiveness of such pole and permitting substantial reduction in bearing size.

It is still another object of the present invention to provide structure of the character described wherein components are deployed in such relative orientation as to comprise a new bearing.

Further objects and advantages of the present invention will become apparent as the description proceeds, as will various modifications and changes which can be made to the structure of the device without departing from the spirit of the present invention. Such additional objects, advantages, modifications, and changes are intended to be covered by the scope of the appended claims.

In the drawings:

FIG. 1 is an end elevational view with portions broken away;

FIG. 2 is a side elevational view of the structure in FIG. 1 with the shroud removed and portions broken away;

FIG. 3 is a fragmentary end elevational view of the bearing structure with portions broken away to show details of construction;

FIG. 4 is an isometric view of a portion of the bearing structure to show the relationship of the parts and the relationship of the structure to the electrical system for its operation; and FIG. 5 is a wiring diagram of the electrical system for the bearing structure.

Referring now to the drawings and more particularly to FIGS. 1 and 2 thereof a machine is disclosed and generally identified by the numeral 10. Machine 10 might be any type of machine using a spindle or shaft but it is believed that the greatest economic utility can be obtained through use of the present invention on large prime movers such as turbines, generators, and like machines.

Machine 10 has a pair of support bases 12 fixed to an elongated machine support floor 14 adjacent either end thereof by the use of any suitable bolts or fastening means 16. Extending upwardly from base 12 are shaft or spindle supports 20 and 22 respectively. Each support is provided with a support pin 24. Support pins 24 face toward each other and are axially aligned above and parallel to the longitudinal centerline axis of floor 14. A shaft or spindle 26 extends between support pins 24 and is provided with an aperture in either end (not shown) to receive pin 24 to support shaft 26 when it is at rest.

A helical driven gear 28 is disclosed fixedly mounted on shaft 26 adjacent that end of shaft 26 adjacent to pin 24 on support 22. A helical driven gear 30 on motive power shaft 32 in driving engagement with gear 28 is disclosed for the purpose of disclosing one manner in which motive power might be transferred to shaft 26.

Fixed to shaft 26 intermediate its ends are one or more bearing collar sets 34 consisting of two parallel axially spaced collar rings 36 and 38. These collar sets may be separate pieces fixed to shaft 26 in any suitable manner or they may be machined from shaft 26 when the shaft is originally made. A plurality of axially aligned apertures 40 are provided in rings 36 and 38. A plurality of first magnet bars 42 having an aperture 44 adjacent one end thereof may be fixed at one end to rings 36 and 38 by bolts through apertures 40 and 44 to extend radially outwardly from shaft 26.

An electro-magnet 46 is fixed in any suitable manner (not shown) to each bar 42 proximate the radially outward extremity of bar 42.

A bearing shroud structure 48 is provided coupled to floor 14 in any suitable manner (not shown) and circumscribing in radially spaced relation the portion of shaft 26 on which bars 42 are mounted. Extending radially inwardly from shroud 48 toward shaft 26 in the same vertical plane as bars 42 are in are a plurality of elongated second magnet bars 50. Bars 50 may be mounted at one end to shroud 48 in any suitable manner (not shown). The end of bars 50 remote from shroud 48 are a squared off u-shaped configuration 52 in vertical plan view taken axially along shaft 26. An electro-magnet 54 is fixed in any suitable manner (not shown) to each bar 50 proximate the radial outer end of each bar.

It can be seen from the description thus far that as shaft 26 turns the radially outerward most extremity of bars 42 will pass between the legs of the u-shaped configuration 52 on the radially inward most extremity of bars 50. It should be further noted, as it is important to this invention, that bars 42 and 50 and the legs of configuration 52 are rectangular in cross-section. The radially inwardly facing surface of configuration 52 relative to shaft 26 and the radially outwardly facing surface of bar 42 have a direct mathematical magnetic relationship of one to one as do the axially outwardly facing surfaces of bar 42 relative to the inwardly axial facing surfaces of configuration 52.

The present invention proposes the activation electro-magnetically of magnets 46 and 54 in a manner which will hereinafter be described to induce like pole repelling magnetic polarization of the configuration 52 and the inward most extremity of bars 42. Such activation and polarization will cause shaft 26 to be magnetically suspended both longitudinally and axially. If such activation takes place prior to the application of rotating motive power to shaft 26 through shaft 32, gears 30 and 28 it can be seen that frictional wear is almost entirely eliminated.

Referring again to FIG. 2 of the drawings, there is disclosed a sump 56 containing a super coolant such as liquid hydrogen or the like. Sump 56 is coupled to a pump 58 by fluid flow intake conduit 60. Pump 58 is further provided with an elongated discharge fluid flow conduit 62 coupled at one end to pump 58 at the other end to supply fluid flow conduit 64.

Shroud structure 48 is provided with interior walls defining four circular cavities 66, 68, 70, and 72 generally rectangular in cross-section. Cavities 66 and 68 have a diameter placing them immediately adjacent on either side within shroud 48 of electro-magnets 46. Cavities 70 and 72 have a diameter placing them immediately adjacent on either side within shroud 48 of electro-magnets 54.

Supply conduit 64 is provided with elongated input port conduits 74, 76, 78, and 80 connected at one end to conduit 64 and connected respectively to the lower half as viewed in FIG. 2 of cavities 66, 68, 70, and 72 at their opposite ends.

An elongated fluid flow return conduit 82 is connected at one end to sump 56 and is coupled to one end of elongated fluid flow discharge conduits 84, 86, 88, and 90. The other ends of conduits 84, 86, 88, and 90 are connected respectively to the upper half as viewed in FIG. 2 of cavities 66, 68, 70 and 72.

It can be seen from the foregoing description that a completely closed fluid system is provided for super-cooling the magnetic bearing structure described which substantially increases the bearings efficiency. Additionally, super-cooling enables the bearing to be constructed in comparatively miniaturized form since super-cooling increases a magnet's magnetic capabilities many hundreds of times.

Referring now particularly to FIG. 5 of the drawings, a diagram of the electrical system for a machine representing the present invention is disclosed and generally identified by the numeral 92. Electrical system 92 includes a source of alternating current electrical power identified by the numeral 94 electrically coupled by wires 96 and 98 to a transformer 100 which converts said alternating current to direct current. Transformer 100 is connected by wires 102 and 104 to a module 106 which includes a power amplifier 108, a modulator 110, and an amplifier 112. Amplifier 112 is electrically connected to a system interpretor 114 by wires 116, 118, 120, and 122. Interpretor 114 is coupled to two proximity sensors 124 and 126 by electrical wires 128, 130, 132, and 134 respectively. Shaft 26 is disclosed provided with schematic representations of electro-magnets 46. Disclosed immediately above and below electro-magnets 46 as disclosed in FIG. 5 are schematic representations of electro-magnets 54. Electrical circuit wires 136 and 138 are coupled to power amplifier 108 at one end and connected with schematically disclosed mercury brushes 140 and 142 at their ends remote from power amplifier 108. Shaft 26 is provided with a pair of electrical contact rings 144 and 146 which are disposed on shaft 26 to engage with brushes 140 and 142 in an arrangement which is well known in the art. The upper most magnet 46 as disclosed in FIG. 5 is coupled to one end each of electrical wires 148 and 150 respectively. The opposite end of wires 148 and 150 respectively are coupled to contact rings 144 and 146 respectively.

A second set of wires 152 and 154 are coupled at one end to power amplifier 108 and terminate in mercury brushes 156 and 158 disclosed schematically. A second set of contact rings 160 and 162 are disposed on shaft 26 to contact mercury brushes 156 and 158 respectively. Lower electro-magnet 46 as disclosed in FIG. 5 is coupled to one end each of wires 164 and 166 respectively. The opposite ends of wires 164 and 166 are connected to contact rings 160 and 162 respectively. A third set of wires 168 and 170 are coupled at one end to power amplifier 108 and at their remote ends to the upper most magnet 54 as disclosed in FIG. 5. A fourth set of wires 172 and 174 are connected at one end each to power amplifier 108 and at the other end of each to the lower most magnet 54 as disclosed in FIG. 5.

It will now be seen from the description of the electrical system how power is supplied to the electro-magnets which form an integral part of the bearing structure described in this application. It should be noted that this same description would apply to each like set of magnets which would be used in the machine and the inventor has limited himself to one set for purposes of explaining the operation of his system. The system described assumes a minimum of three distinct circumstances of operation.

In the first circumstance, the machine is at rest and all of the power is off and none of the structure described is activated.

In the second circumstances, the machine is turned on but no motive power is being supplied to shaft 26. In this situation, alternating current from source 94 flows through a circuit including wires 96 and 98 to transformer 100 which converts the alternating current to direct current. The direct current from transformer 100 flows through a circuit including wires 102 and 104 to module 106 and in particular to power amplifier 108 of said module 106. Power amplifier 108 supplies power through a circuit including wires 168 and 170 to upper magnet 54 as disclosed in FIG. 5 and similarly through a circuit including wires 172 and 174 to lower magnet 54 as shown in FIG. 5. At the same time, amplifier 108 provides power through wires 136 and 138, brushes 140 and 142, rings 144 and 146, and wires 148 and 150 to upper magnet 46 as shown in FIG. 5 and likewise through a circuit including wires 152 and 154, brushes 156 and 158, rings 160 and 162, and wires 164 and 166 to lower magnet 46 as disclosed in FIG. 5. It must be assumed that the respective magnets 46 and 54 surround their respective bars 42 and 50 as previously disclosed herein. In the preferred form of the present invention, all of the bars 42 and 50 are magnetized to be like poles which repel. In this state, the operation of the magnetic laws through the activation of the magnets 46 and 54 will center shaft 26 in a state of magnetic equilibrium within the bearing structure as outlined or in a state commonly known as suspension. Motive force at this point may be applied as previously described to shaft 26 and up to the extent of the capabilities of the normal load situation shaft 26 could perform any operation demanded of it while remaining in the state of suspension described.

The third circumstance of operation envisions the potential possibility of overload or abnormal load being applied suddenly to shaft 26 while already in operation. The application of such an overload or abnormal load would tend to cause the shaft 26 and bearing structure described to move radially against the normal ability of the magnetic forces to compensate therefor. In such a circumstance, proximity sensors 124 and 126 would immediately sense the change in proximate relationship relative to shaft 26 and relay that information through wires 128, 130, 132, and 134 respectively to interpretor 114. Interpretor 114 would relay the requirement for change through wires 116, 118, 120, and 122 to amplifier 112, modulator 110, and power amplifier 108 which would then selectively increase magnetism to repelling poles in the radial direction in which the shaft tends to move and decrease the repelling magnetic forces in the opposite radial direction causing shaft 26 to re-assume its state of equilibrium at which time proximity sensors 124 and 126 will restore the system to its normal condition.

When an abnormal load or overload is sensed in an axial direction relative to shaft 26 which might be particularly likely in a vertical shaft machine, proximity sensors 124 and 126 will similarly sense and respond to the proximity change but in such event power to all the electro-magnets in the system would be increased until shaft 26 resumed a position of axial equilibrium and suspension. It must be understood that in an actual system there would be approximately 8 or in any event a substantial number of proximity sensors.

It will now be seen that the benefits of the super-cooling structure previously described which permit relative miniaturization of structure would be of substantial importance particularly with respect to power consumption, longevity of the structure, and the compensating abilities of the bearing in all potential directions of motion. It is further obvious from the preceding description that the inventor has accomplished the unique objective of being able to simultaneously achieve and maintain, even against overload situations, a state of total magnetic equilibrium or suspension of a shaft both against radial and axial movement thereof in a manner which is many times more efficient than the finest of the prior art bearing structures.

I claim:

1. Bearing structure for a machine shaft including a plurality of first magnet means disposed about said shaft extending radially outwardly therefrom and fixed to said shaft to rotate therewith, a plurality of second magnet means fixed to said machine extending radially inwardly therefrom relative to said shaft to be disposed inwardly therefrom proximate to the circular path and travel of said first magnet means, one of said first and second magnet means being constructed and positioned relative to the other of said first and second magnet means such that said first and second magnet means have opposing magnetic radially inwardly and radially outwardly facing surfaces and such that said first and second magnet means have opposing magnetic axially facing surfaces in both directions relative to said shaft to magnetically suspend said shaft against radial and axial displacement, super-cooling means coupled with said machine and disposed closely adjacent to said circular path of travel of said first magnet means and closely adjacent to said second magnet means to substantially reduce the temperatures of the first and second magnet means thereby substantially increasing their magnetic capacity, said first and second magnet means including a plurality of electro-magnets, and means for supplying electrical energy to said machine and including conveying means for conveying said electrical energy from said conveying means for supplying to said electro-magnets.

2. The invention as set forth in claim 1 wherein said plurality of electro-magnets in said first magnet means includes a plurality of first magnet bars generally rectangular in cross-section, each surrounded by an electro-magnetic coil.

3. The invention as set forth in claim 2 wherein said plurality of electro-magnets in said second magnet means includes a plurality of second magnet bars generally rectangular in cross-section and extending radially inwardly from said machine relative to said shaft toward said first magnet bars, said second magnet bars terminating at their furthermost point from said machine in a u-shaped configuration generally rectangular in cross-section, said second magnet bars each being surrounded by an electro-magnetic coil, said magnetic coil on said first magnet bar and said magnetic coil on said second magnet bar magnetically polarizing said bars to like magnetic poles.

4. The invention as set forth in claim 3 wherein said means for supplying electrical energy to said machine includes a plurality of proximity sensors disposed about said shaft for sensing a change in position of said shaft relative to said sensors and means for relaying changes sensed to the means for supplying electrical energy to selectively increase and decrease energy supplied to said first and second magnet means when radial displacement of said shaft is sensed and to uniformly increase electrical energy supplied to said first and second magnet means when axial displacement of said shaft is sensed.

5. The invention as set forth in claim 4 wherein said plurality of sensing means restores the flow of electricity to said first and second electro-magnets to normal uniform operating levels when the state of magnetic suspension against radial and axial displacement is re-achieved.

6. The invention as set forth in claim 5 wherein said super-cooling means reduce the temperature of said electro-magnets to a degree approaching absolute zero.

7. The invention as set forth in claim 6 wherein the radially outwardly facing surface of one of said first magnet bars and the radially inwardly facing surface of said u-shaped configuration of one of said second magnet bars are in a direct mathematical magnetic ration of one to one and wherein the axially inwardly facing surface of one of said u-shaped configurations of one of said second magnet bars and the axially outwardly facing magnetic surfaces of one of said first magnet bars are in a direct mathematical magnetic ratio of one to one.

* * * * *